United States Patent
Dai

(10) Patent No.: US 7,995,124 B2
(45) Date of Patent: Aug. 9, 2011

(54) IMAGE SENSOR APPARATUS AND METHOD FOR IMPROVED DYNAMIC RANGE WITH MULTIPLE READOUT CIRCUIT PATHS

(75) Inventor: Tiejun Dai, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 651 days.

(21) Appl. No.: 11/856,014

(22) Filed: Sep. 14, 2007

(65) Prior Publication Data

US 2009/0073274 A1 Mar. 19, 2009

(51) Int. Cl.
 *H04N 5/335* (2011.01)
 *H03M 1/20* (2006.01)

(52) U.S. Cl. .......................................... 348/300; 341/156

(58) Field of Classification Search .................. 348/300, 348/308, 294; 341/156, 155; 257/291, 292, 257/293, 294; 250/208.1
See application file for complete search history.

(56) References Cited

U.S. PATENT DOCUMENTS

| | | | | |
|---|---|---|---|---|
| 4,733,217 A | * | 3/1988 | Dingwall | 341/156 |
| 5,274,377 A | * | 12/1993 | Matsuura et al. | 341/156 |
| 5,283,581 A | * | 2/1994 | Miki et al. | 341/156 |
| 5,790,191 A | | 8/1998 | Zhang | |
| 6,128,039 A | | 10/2000 | Chen et al. | |
| 6,570,617 B2 | | 5/2003 | Fossum et al. | |
| 6,953,923 B2 | | 10/2005 | Yang et al. | |
| 7,091,531 B2 | | 8/2006 | Boemler | |
| 7,119,317 B2 | | 10/2006 | Ando et al. | |
| 7,176,434 B2 | | 2/2007 | Altice, Jr. et al. | |
| 7,259,413 B2 | | 8/2007 | Rhodes | |
| 7,565,033 B2 | * | 7/2009 | Hanson et al. | 348/308 |
| 2005/0062867 A1 | * | 3/2005 | Mabuchi | 348/308 |
| 2005/0225468 A1 | * | 10/2005 | Cosand | 341/155 |
| 2006/0181622 A1 | | 8/2006 | Hong | |
| 2006/0243891 A1 | | 11/2006 | Shah | |
| 2007/0279506 A1 | * | 12/2007 | Sato | 348/302 |

FOREIGN PATENT DOCUMENTS

JP 56125115 A * 10/1981

OTHER PUBLICATIONS

Bergren, Charles M., "Anatomy of a Robot," 2003, The McGraw-Hill Companies, Inc., p. 201.*

* cited by examiner

*Primary Examiner* — Jason Whipkey
(74) *Attorney, Agent, or Firm* — Lathrop & Gage LLP

(57) ABSTRACT

An image sensor apparatus comprises an image sensor for generating digital images having a high dynamic range. The image sensor apparatus includes an image sensor for generating a first and a second set of digital image samples at a first bit depth, with each set of digital image samples generated by a different column readout circuit path. A processor combines the first and second set of digital image samples to generate a digital image at a second bit depth, the second bit depth higher than the first bit depth.

18 Claims, 8 Drawing Sheets

IMAGE SENSOR APPARATUS AND METHOD FOR IMPROVED DYNAMIC RANGE WITH MULTIPLE READOUT CIRCUIT PATHS

BRIEF DESCRIPTION OF THE INVENTION

This invention relates generally to improving the dynamic range of CMOS image sensors. More particularly, this invention relates to an image sensor apparatus and method for improving the dynamic range of CMOS image sensors by using multiple readout circuit paths.

BACKGROUND OF THE INVENTION

Image sensors are devices that capture and process light into electronic signals for forming still images or video. Their use has become prevalent in a variety of consumer, industrial, and scientific applications, including digital cameras and camcorders, hand-held mobile devices, webcams, medical applications, automotive applications, games and toys, security and surveillance, pattern recognition, and automated inspection, among others. The technology used to manufacture image sensors has continued to advance at a rapid pace.

There are two main types of image sensors available today: Charge-Coupled Device ("CCD") sensors and Complementary Metal Oxide Semiconductor ("CMOS") sensors. Until recently, the majority of image sensors have been of the CCD type. Early CMOS sensors suffered from poor light sensitivity and high noise levels that restricted their use to only a few low-cost and low-resolution applications. Recent advances in CMOS technology have led to the development of high performance CMOS sensors that are quickly replacing CCDs in a host of other applications, particularly in those where speed, power consumption, size, and on-chip functionality are important factors.

In either type of image sensor, a light gathering photosite is formed on a substrate and arranged in a two-dimensional array. The photosites, generally referred to as picture elements or "pixels," convert the incoming light into an electrical charge. The number, size, and spacing of the pixels determine the resolution of the images generated by the sensor. Modern image sensors typically contain millions of pixels in the pixel array to provide high-resolution images.

The electrical charges accumulated by each pixel in the pixel array are typically read out by a "readout circuit," where they are converted into digital image samples based on the order in which the pixels in the pixel array are selected for readout. The readout circuit may include a combination of amplifiers, sample and hold circuits, analog to digital converters ("ADC"), and other circuit elements for converting the two-dimensional electrical charges into the digital image samples. The digital image samples may be further processed at an Image Signal Processor ("ISP") or other Digital Signal Processor ("DSP") to generate a digital image output.

Several approaches are available for selecting the order in which the pixels in the pixel array are to be read out by the readout circuit. For example, pixels in the array may be individually read out and processed sequentially. Alternatively, pixels in a row may be read out simultaneously and processed in parallel by readout circuits for each column. The processed signals are stored in a line memory, then read out sequentially. Because each readout circuit in this case processes a row at a time, their frequency and power requirements are significantly reduced. This parallel approach is used in most CMOS image sensor devices.

An example of a CMOS image sensor device employing this parallel approach is illustrated in FIG. 1. CMOS image sensor device 100 includes a pixel array 105 with a plurality of pixels arranged in a two-dimensional pattern of row and column lines. The CMOS image sensor device 100 is operated by a controller 110, which controls the selection of pixels from the pixel array 105 to be read out. All pixels in a row are turned out simultaneously and readout in parallel by a plurality of column readout circuits 115. The pixels in a row line are selected and activated by row selector circuit 120 in response to control signals from controller 110. The row selector circuit 120 applies a driving voltage to the selected row line to activate the pixels in the selected line. The pixels in the selected line are then read out by the column readout circuits 115 in response to control signals from controller 110.

Each column line is connected to a column readout circuit. The column readout circuits are, in turn, connected to pixel output stage 125. The pixel output stage 125 takes the electrical charges readout by the column readout circuits 115 and converts them into digital image samples. The samples are then processed at processor 130 for generating the digital image output 135.

An example of column readout circuits 115 connected to an output stage 125 is shown at FIG. 2. Column readout circuits 115a-b include column amplifiers 205a-b for amplifying the electrical charges readout from pixels 210a in column line 215a and the electrical charges readout from pixels 210b in column line 215b, respectively. Column readout circuits 115a-b also include sample and hold circuits 220a-b for reading out the amplified charges. The column lines 215a-b, also referred to as "bit lines," are the lines to which all of the pixels of a given column are connected and from which the electrical charges from each pixel are read.

The electrical charges are input into pixel output stage 125, which includes second stage or global amplifier 225 for further amplification of the electrical charges and ADC 230 for converting the electrical charges into digital image samples.

A typical pixel in pixel array 105 may employ a photodetector followed by a four-transistor ("4T") configuration as shown in FIG. 3. Pixel 300 includes a photodetector 305 followed by a transfer transistor 310, a reset transistor 315, a source follower transistor 320, and a row select transistor 325. The photodetector 305 converts the incident light into an electrical charge. The electrical charge is received by a floating diffusion region 330 through the transfer transistor 310 when the transfer transistor 310 is activated by the transfer gate control signal "TX." The reset transistor 315 is connected between the floating diffusion region 330 and a supply voltage line 335. A reset control signal "RST" is used to activate the reset transistor 310 for resetting the floating diffusion region 330 to the supply voltage $V_{cc}$ at supply voltage line 335 prior to transferring the electrical charge from photodetector 305.

The source follower transistor 320 is connected to the floating diffusion region 330 between the supply voltage line 335 and the row select transistor 325. The source follower transistor 320 converts the electrical charge stored at the floating diffusion region 330 into an output voltage "$V_{out}$." The row select transistor 325 is controlled by a row select signal "RS" for selectively connecting the source follower transistor 320 and its output voltage $V_{out}$ into a column line 340 of a pixel array.

The 4T configuration shown at FIG. 3 was introduced to improve the overall image quality produced by CMOS image sensor devices. Image quality at a CMOS image sensor device depends on a host of factors, such as, for example, the noise sources introduced by the circuitry in the sensor and the dynamic range achievable with such circuitry. The noise sources include fixed pattern noise ("FPN") and read noise introduced by the column readout circuits, reset noise introduced by the reset transistor, photon shot noise introduced by the photodetector, and other noise sources such as dark current noise and thermal noise.

The FPN can be significantly reduced or eliminated with the use of specialized column amplifiers or by performing flat-field correction. For example, U.S. Pat. No. 6,128,039 describes a column amplifier using a switching capacitor amplifier for high FPN reduction. The reset noise can also be eliminated with the use of a technique called Correlated Double Sampling ("CDS") at the sample and hold circuit stage of the column readout circuit. CDS samples the voltage output at the column line twice, during reset of the reset transistor and during the transfer of the output voltage at the source follower transistor. The samples are subtracted from each other thereby cancelling the reset noise. Other forms of noise, such as the photon shot noise, the dark current noise, and the thermal noise are more difficult to cancel.

Several approaches have also been proposed to improve the dynamic range of CMOS image sensors. The dynamic range is defined as the ratio of the largest detectable luminance signal to the smallest. A high dynamic range is desirable in low-light conditions and for capturing images with large variations in luminance, that is, for capturing the wide range of luminance levels found in most real-world scenes. As the dynamic range of a sensor is increased, the ability to simultaneously record the dimmest and brightest intensities in an image is improved.

The dynamic range of an image sensor is usually expressed in gray levels, decibels or bits. Image sensors having higher signal-to-noise ratios produce higher dynamic range values (more decibels or bits). In addition, image sensors having ADCs of higher bit depths also produce higher dynamic range values. For example, a 12-bit ADC corresponds to slightly over 4,000 gray levels or 72 dBs, while a 10-bit ADC can resolve only 1,000 gray levels for a 60 dB dynamic range.

Efforts for improving the dynamic range of CMOS image sensors have focused on designing improved pixel cells, column amplifiers, or readout circuits. CMOS image sensor devices employing high bit depth ADCs, such as 14-bit ADCs, are known, but these devices tend to be costly, require more complex column readout circuits, and consume a considerably higher amount of power and semiconductor die area as compared to their CCD counterparts.

Accordingly, it would be desirable to provide a CMOS image sensor apparatus that provides an improved dynamic range and better noise reduction without requiring costly and power-driven column readout circuits. In particular, it would be desirable to provide a CMOS image sensor apparatus that is capable of emulating the high dynamic ranges achievable by higher bit depth ADCs without their associated more complex column readout circuits.

SUMMARY OF THE INVENTION

An image sensor apparatus has an image sensor for generating a first and a second set of digital image samples at a first bit depth, each set of digital image samples generated by a different column readout circuit path. A processor combines the first and the second set of digital image samples to generate a digital image at a second bit depth, the second bit depth higher than the first bit depth.

An embodiment of the invention includes an image sensor apparatus for emulating a dynamic range achievable with a first bit depth analog-to-digital converter. The image sensor apparatus includes an array of pixels arranged in a plurality of row lines and column lines. A plurality of first and second column readout circuits are connected in parallel to the plurality of column lines, each first column readout circuit connected to a first output stage and each second column readout circuit connected to a second output stage, the first and second output stages generating digital image samples at a second bit depth. A processor is connected to the first and second output stages to receive the digital image samples and generate a digital image output of the first bit depth from the digital image samples.

Another embodiment of the invention includes a method for providing high dynamic range digital images with a CMOS image sensor. Electrical charges are generated from incident light with an array of pixels arranged in a plurality of row lines and column lines. The electrical charges are read from the array of pixels with a plurality of first and second column readout circuits connected in parallel to the plurality of column lines, the first and second column readout circuits having different amplification responses. The electrical charges are converted into digital image samples of a first bit depth with a first and a second output stage, the first output stage connected to the plurality of first column readout circuits and the second output stage connected to the plurality of second column readout circuits. The digital image samples are processed to generate a digital image output at a second bit depth.

A further embodiment of the invention includes an image sensor apparatus for generating a digital image output and including an image sensor for generating digital image samples at a first depth with a first and second column readout circuit paths of different amplification responses, the first bit depth smaller than a second bit depth of the digital image output.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

An image sensor apparatus for generating high dynamic range digital images is provided. As generally used herein, an image sensor may be a device or circuitry having an array of pixels for capturing and processing an optical image into electronic signals. The electronic signals may be typically read by readout circuits, converted into digital image samples by output stages following the readout circuits and processed by an image signal processor ("ISP") or other device or circuitry capable of processing digital image samples into digital images or video.

The readout circuits may be any circuit capable of reading out electrical charges accumulated by pixels in an image sensor. The output stages following the readout circuits may include analog-to-digital converters ("ADCs") for converting the electrical charges read by the readout circuitry into digital image samples. The ISP in turn may include various executable routines for processing the digital image samples to generate a digital image output.

Figure 4:
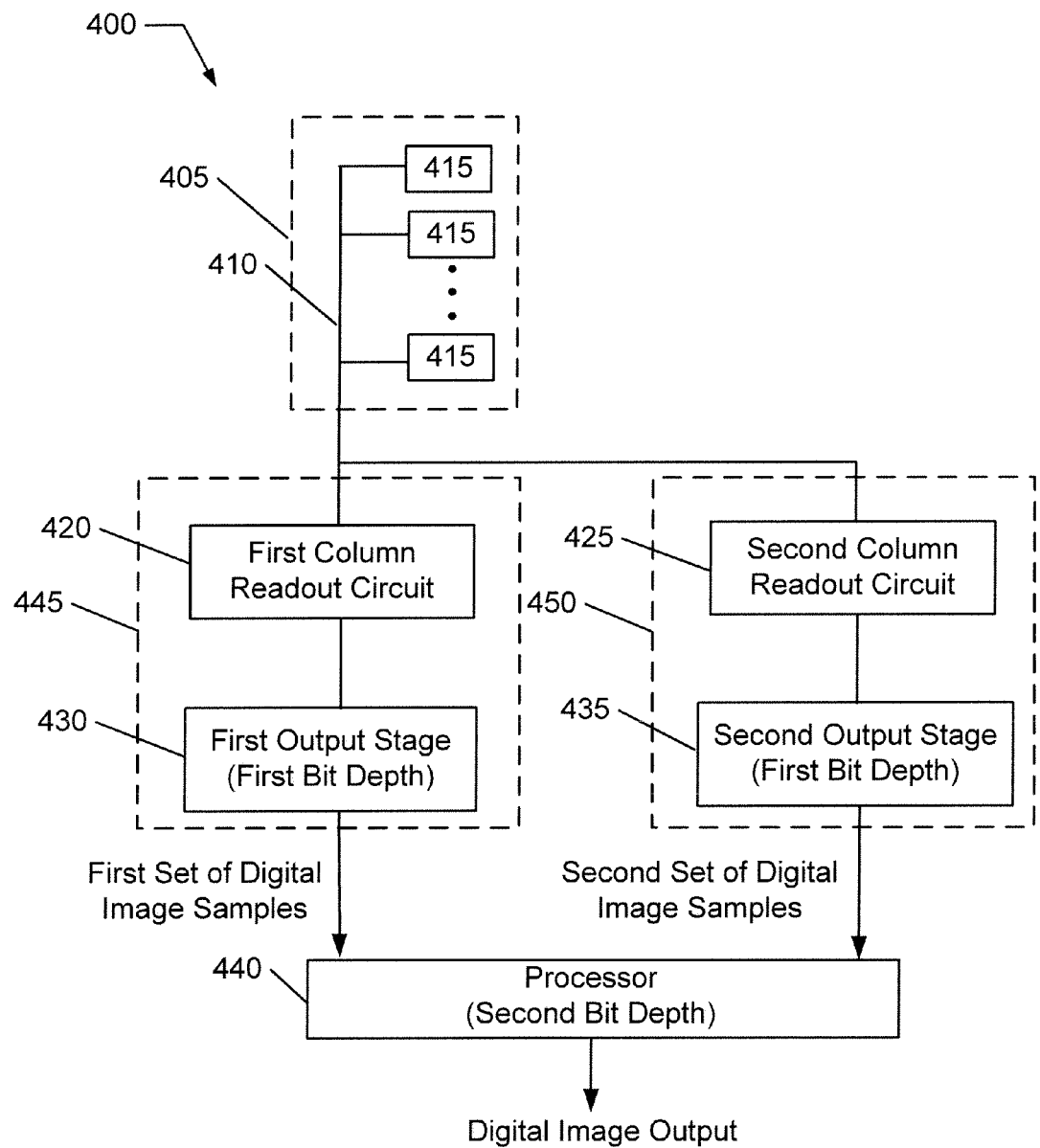
FIG. 4 illustrates a CMOS image sensor apparatus constructed in according to an embodiment of the invention.

An image sensor apparatus constructed according to an embodiment of the invention is illustrated in FIG. 4. Image sensor apparatus 400 has pixel array 405 composed of a plurality of pixels arranged in a two-dimensional pattern of row lines and column lines. Each pixel in pixel array 405 receives incident light and converts it into electrical charges corresponding to image information captured by the incident light.

Figure 1:
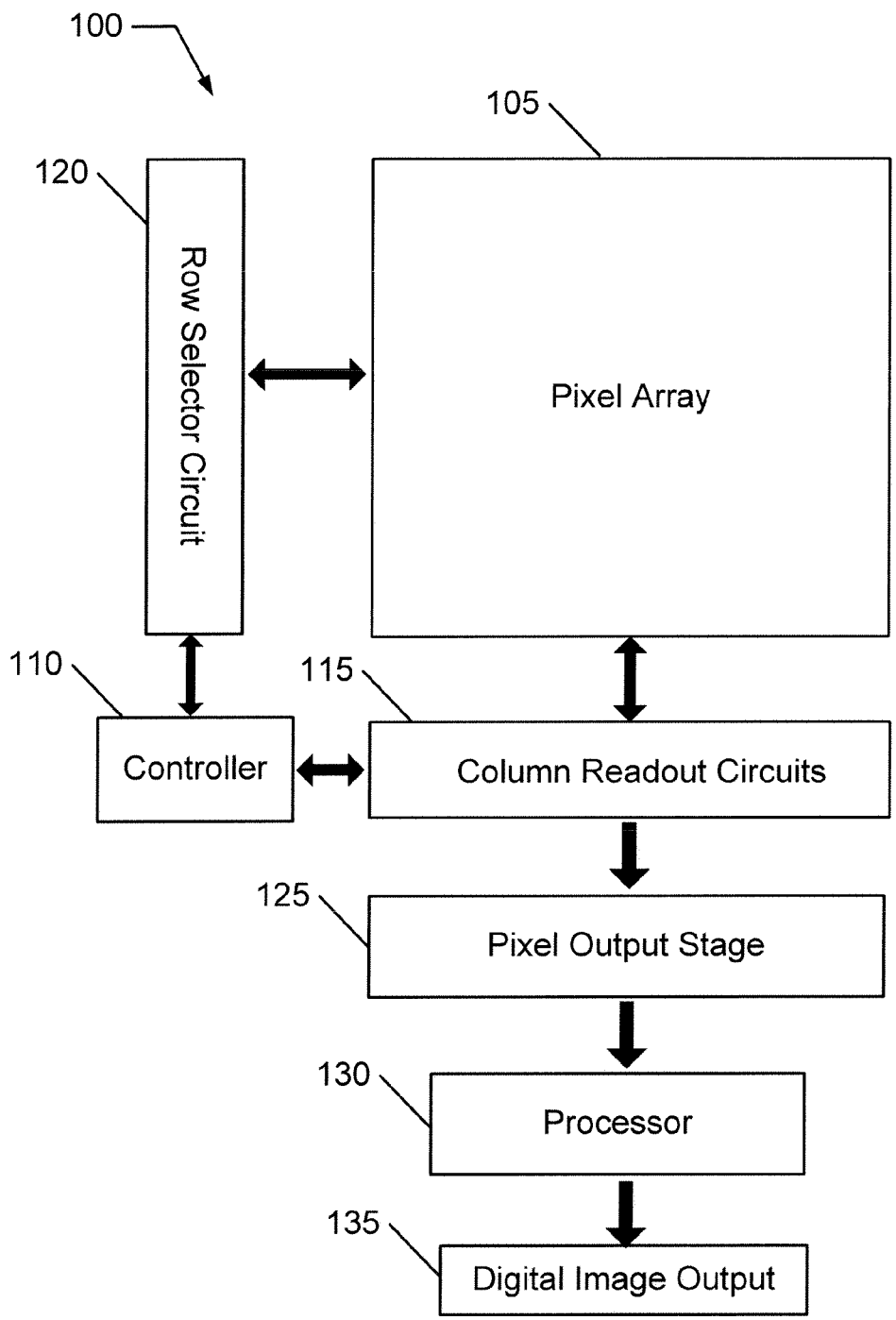
FIG. 1 illustrates a prior art CMOS image sensor apparatus.
Figure 2:
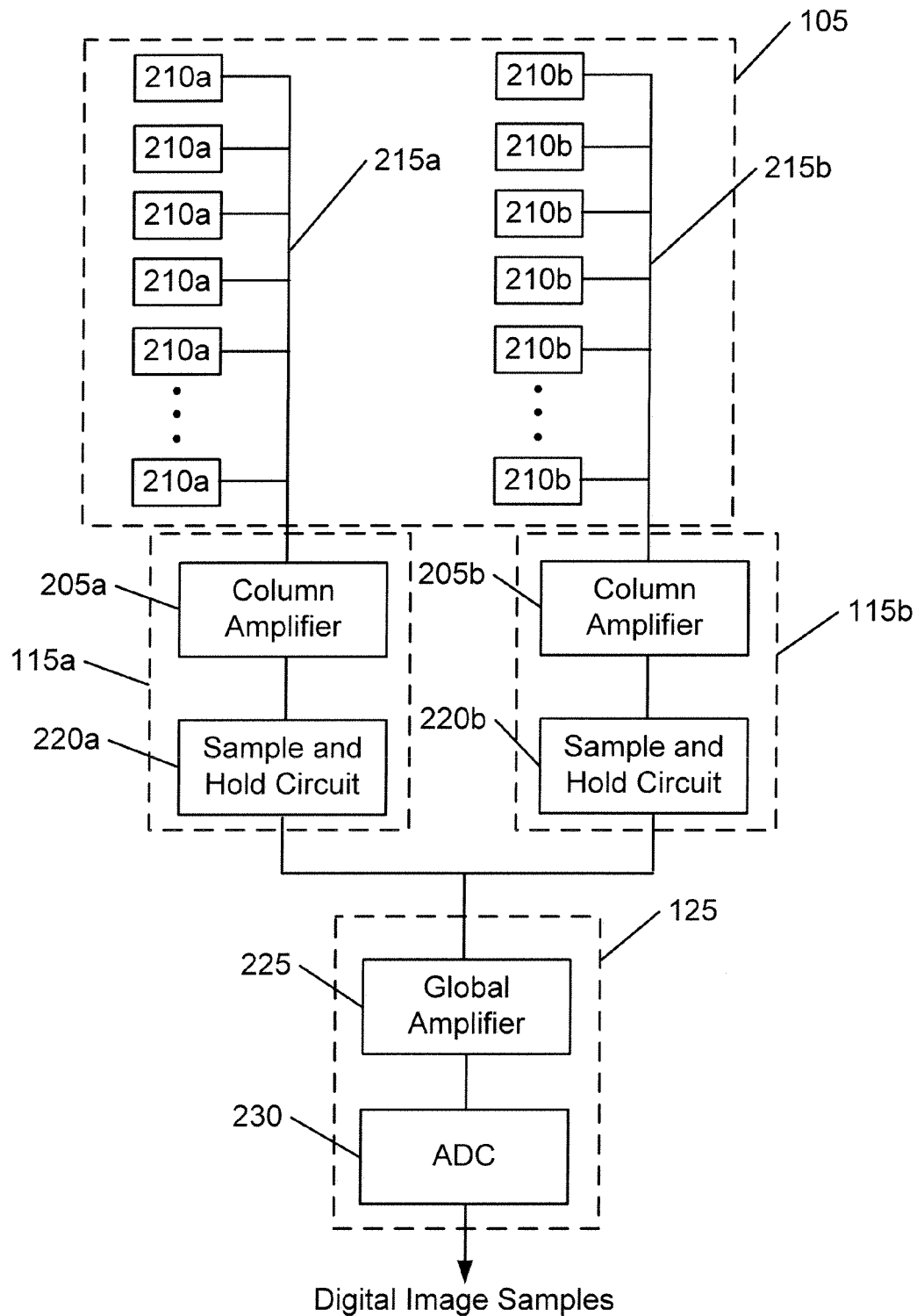
FIG. 2 illustrates a prior art column readout circuit and an output stage for use with the CMOS image sensor apparatus of FIG. 1.
Figure 3:
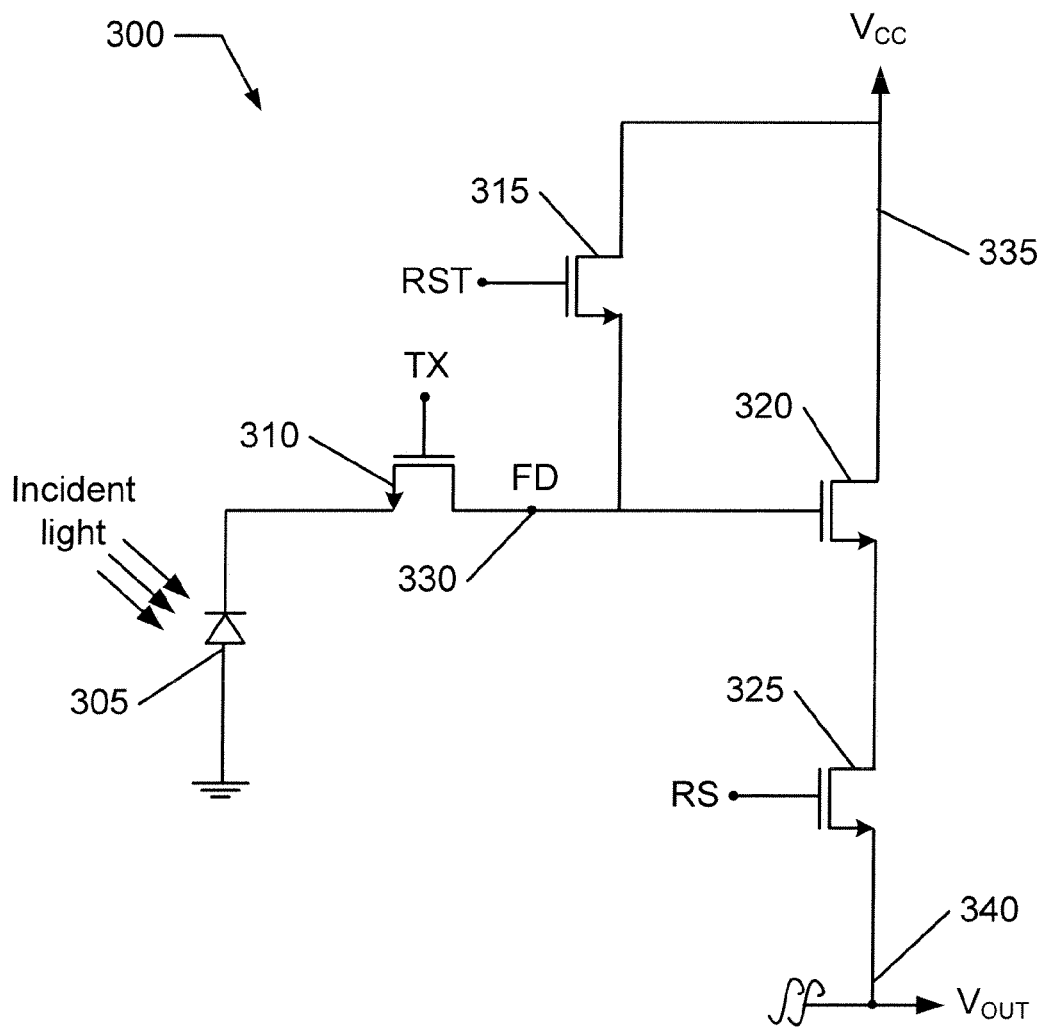
FIG. 3 illustrates a prior art pixel for use with the CMOS image sensor apparatus of FIG. 1.

It is appreciated that the pixels in pixel array 405 may be pixels having the four transistor configuration shown in FIG. 3. It is also appreciated that each pixel may include a row select "RS" control signal input indicative of a row selected for readout at any given time.

In one exemplary embodiment, the electrical charges accumulated in each pixel are read out in parallel one row at a time. In this exemplary embodiment, all the pixels of a given row are read out in parallel by a plurality of column readout circuits, with each column readout circuit reading out the electrical charges accumulated in the pixels of a given column line.

For example, the electrical charges accumulated in each pixel 415 of column line 410 are read out by a first column readout circuit 420 and by a second column readout circuit 425. As shown in more detail herein below, first and second column readout circuits 420-425 include a sample and hold circuit for converting the electrical charges into a set of analog samples. The sample and hold circuit may be connected to one or more control signals indicative of a column selected for readout at any given time. The control signals may be, for example, generated by a controller (not shown) in CMOS image sensor apparatus 400. It is appreciated that each column line in pixel array 405 is connected to a set of first and a second column readout circuits equivalent to (i.e., having the same circuit components as) first and second column readout circuits 420-425 connected to column line 410.

First and second column readout circuits 420-425 are respectively connected to a first output stage 430 and to a second output stage 435. First column readout circuit 420 and first output stage 430 form first readout circuit path 445. Similarly, second column readout circuit 425 and second output stage 435 form second readout circuit path 450.

First and second output stages 430-435 convert the analog image samples generated by first and second column readout circuits 420-425 into a set of digital image samples. First output stage 430 converts the analog image samples generated by first column readout circuit 420 into a first set of digital image samples and second output stage 435 converts the analog image samples generated by second column readout circuit 425 into a second set of digital image samples.

In one exemplary embodiment, output stages 430-435 also amplify the analog image samples generated by first and second column readout circuits 420-425 prior to analog-to-digital conversion. It is appreciated that a single first output stage 430 and a single second output stage 435 are connected to all the column readout circuits used in CMOS image sensor apparatus 400 for reading out electrical charges accumulated in the pixels of pixel array 405. It is also appreciated that first and second output stages 430-435 each receive a set of analog image samples corresponding to a single pixel at a time in response to control signals indicative of a row and a column selected for readout, as described in more detail herein below.

Also according to an exemplary embodiment of the invention, first and second output stages 430-435 convert the analog image samples generated by first and second column readout circuits 420-425 into the first and second set of digital image samples using ADCs of a first bit depth, for example, using 10-bit ADCs.

The first and second set of digital image samples generated by first and second output stages 430-435 are processed by processor 440 to generate a digital image output. It is appreciated that the first and second set of digital image samples correspond to the electrical charges accumulated in a single pixel. As such, the first and second set of digital image samples may be equivalent and represent redundant information.

Processor 440 may include an ISP or a DSP for processing digital image samples into a digital image output. In this exemplary embodiment, processor 440 is a processor having a second bit depth, for example, a 14-bit ISP. The second bit depth may be at least equal to or higher than the first bit depth.

Processor 440 may include routines for combining digital image samples of a first bit depth to generate a digital image output of a second bit depth. For example, processor 440 may include a routine for averaging the first set of digital image samples generated by output stage 430 with the second set of digital image samples generated by output stage 435. Other routines may be used to combine the first and second set of digital image samples to form the digital image output.

It is appreciated that using two redundant sets of digital image samples at a first bit depth to generate a digital image output at a second bit depth improves the dynamic range of the CMOS image sensor apparatus 400 with the use of simpler and less expensive circuitry than traditionally required for a digital image output of a second bit depth. For example, a digital image output of a second bit depth may be achieved without the use of ADCs having the second bit depth and their associated more complex and costly column readout circuits.

In one exemplary embodiment, a 14-bit dynamic range may be achieved with the use of two 10-bit ADCs, one in first output stage 430 and another in second output stage 435. It is appreciated that the use of two 10-bit ADCs provide a significant savings over the use of a single 14-bit ADC without the need to employ complex calibration procedures generally required for higher bit depths ADCs.

This enables CMOS image sensor apparatus 400 to emulate the high dynamic ranges achievable with high bit depth ADCs by using lower bit depth ADCs. It is appreciated that current ADCs for use with CMOS image sensors may be considered to have high bit depths if they have at least a 14-bit depth. It is also appreciated that ADCs and processors of other bit depths, e.g., higher than 14 bits, may be used without deviating from the principles and embodiments of the invention.

Figure 5:
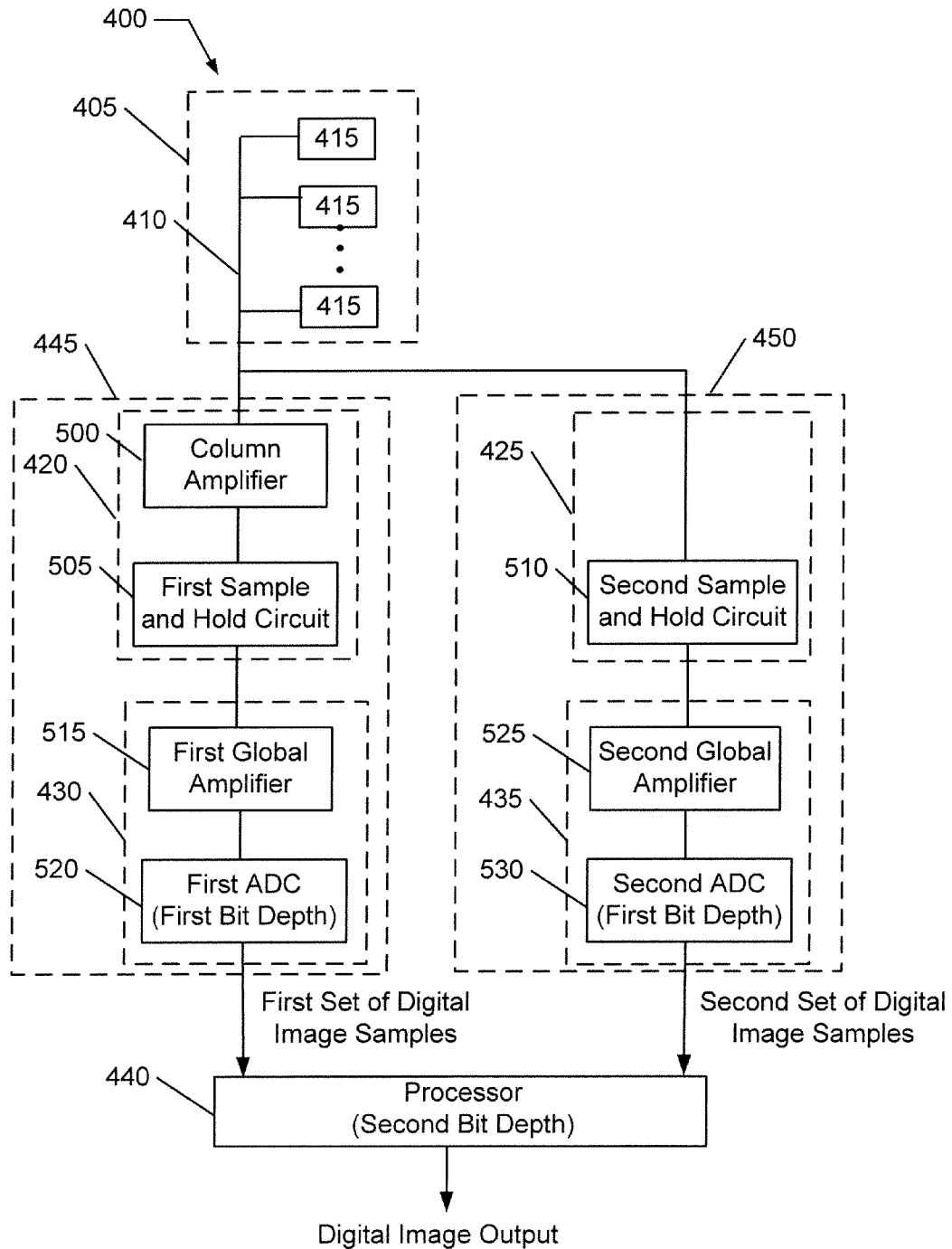
FIG. 5 illustrates a more detailed view of the CMOS image sensor apparatus of FIG. 4.

A more detailed view of the CMOS image sensor apparatus 400 is illustrated in FIG. 5. First column readout circuit 420 includes a column amplifier 500 for amplifying the electrical charges accumulated in each pixel 415 of column line 410 and a sample and hold circuit 505 for converting the amplified electrical charges into a first set of analog image samples. Second column readout circuit 425 does not include a column amplifier and reads out the electrical charges accumulated in each pixel 415 of column line 410 directly into a sample and hold circuit 510. It is appreciated that the sample and hold circuit 505 in first column readout circuit 420 and the sample and hold circuit 510 in second column readout circuit 425 may be equivalent, that is, containing the same circuit components.

It is also appreciated that the use of column amplifier 500 in first column readout circuit 420 but not in second column readout circuit 425 may provide two signal paths in CMOS image sensor apparatus 400 having different amplification responses. First column readout circuit 420 together with output stage 430 may be used to provide a first column readout circuit path 445 and second column readout circuit 425 together with output stage 435 may be used to provide a second column readout circuit path 450.

First column readout circuit path 445 may be a "bright" signal path as column amplifier 500 amplifies the electrical charges accumulated in pixels 415 of column line 410 to capture higher and brighter luminance values and achieve a higher dynamic range. Second column readout circuit path 450, without a column amplifier, may be a "dark" signal path to capture the lower and darker luminance values and also contribute to the higher dynamic range of CMOS image sensor apparatus 400.

It is appreciated that second column readout circuit 425 may also include a column amplifier to further improve the dynamic range of CMOS image sensor apparatus 400. Further, it is appreciated that column amplifier 500 in column readout circuit 420 may be a column amplifier specifically designed to achieve a higher dynamic range.

It is also appreciated that first and second column readout circuit paths 445-450 may be designed to provide a given amplification response to achieve a desired dynamic range. For example, first column readout circuit path 445 may be designed with an amplification response to capture as many bright luminance values as desired. Conversely, second column readout circuit 450 may be designed with an amplification response to capture as many dark luminance values as desired. In general, the use of two column readout circuit paths having a bit depth of "n" bits with one column readout circuit path providing an amplification response of a gain of "$2^K$" results in a "n+k" dynamic range. It is therefore appreciated that CMOS image sensor apparatus 400 may be designed with a bit depth and column readout circuit paths having amplification responses as desired to achieve a given dynamic range.

First and second output stages 430-435 include a global amplifier to provide further amplification of the electrical charges accumulated in pixels 415 of column line 410 and also improve the dynamic range of CMOS image sensor apparatus 400. First output stage 430 includes global amplifier 515 and second output stage 435 includes global amplifier 525. The global amplifier 515 and the global amplifier 525 are in turn connected to ADCs 520 and 530, respectively. ADCs 520 and 530 may be ADCs having a first bit depth.

It is appreciated that global amplifier 515 and global amplifier 525 may be equivalent, i.e., containing the same circuit components. It is also appreciated that ADCs 520 and 530 may be equivalent without deviating from the principles and embodiments of the invention.

Figure 6:
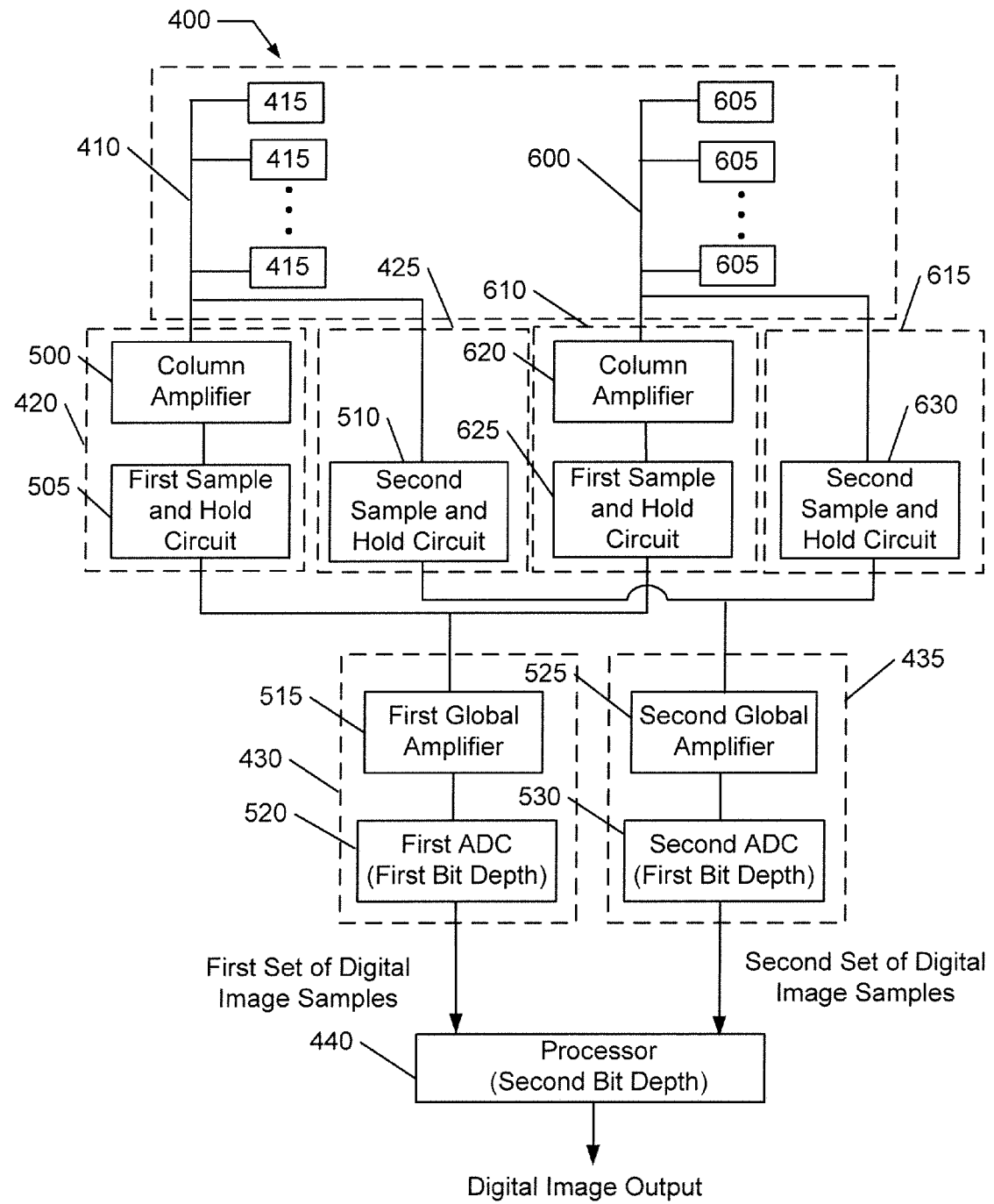
FIG. 6 illustrates a further detailed view of the CMOS image sensor apparatus of FIG. 4.

A further detailed view of the CMOS image sensor apparatus 400 shown in FIG. 5 is illustrated in FIG. 6. Pixel array 405 in CMOS image sensor apparatus 400 is shown with two column lines, column line 410 and column line 600. Each column line of pixel array 405 has a set of first and second column readout circuits connected to it. Column line 410 is connected to first column readout circuit 420 and second column readout circuit 425. Column line 600 is in turn connected to first column readout circuit 610 and second column readout circuit 615.

Similar to first column readout circuit 420, first column readout circuit 610 also includes a column amplifier 620 and a sample and hold circuit 625. And similar to second column readout circuit 425, second column readout circuit 615 also includes a sample and hold circuit 630 directly connected to a column line. It is appreciated that column amplifiers 500 and 620 may be equivalent. It is also appreciated that sample and hold circuits 505, 510, 625, and 630 may also be equivalent.

First column readout circuits 420 and 610 are both selectively connected to first output stage 430. Conversely, second column readout circuits 425 and 615 are both selectively connected to second output stage 425. Control signals input to sample and hold circuits 505, 510, 625, and 630 indicate the column of pixel array 405 selected for processed at any given time by first and second output stages 430-435.

Figure 7:
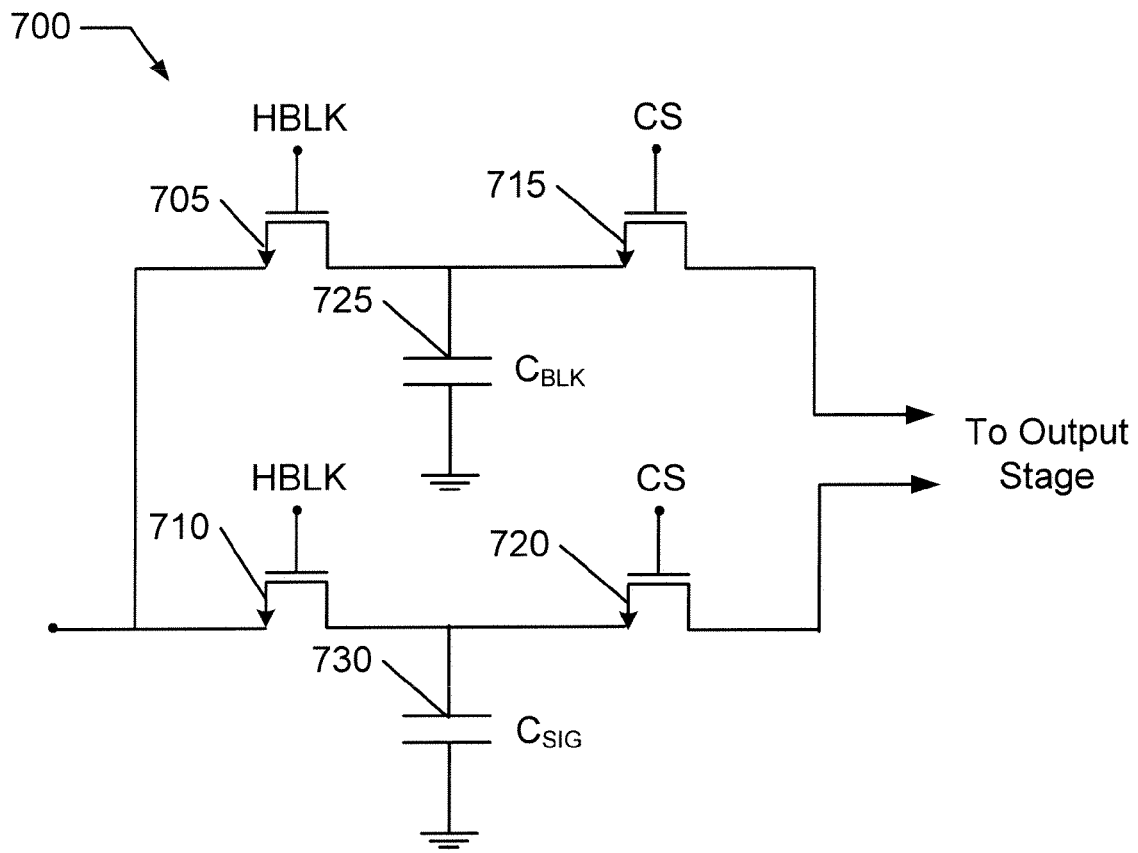
FIG. 7 illustrates a sample and hold circuit for use with the CMOS image sensor apparatus of FIG. 4.

A sample and hold circuit for use with the CMOS image sensor apparatus 400 of FIG. 4 is illustrated in FIG. 7. Sample and hold circuit 700 include a first set of transistors 705 and 710 and a second set of transistors 715 and 720. The first set of transistors 705 and 710 are driven by a control signal indicative of a horizontal blanking interval used in the horizontal (i.e., row) scanning of pixel array 405 ("HBLK"). The second set of transistors 715-720 are driven by a control signal indicative of a column selected for readout ("CS").

A capacitor "$C_{BLK}$" 725 holds the electrical charges accumulated in a pixel of pixel array 400 and read into transistor 705. A capacitor "$C_{SIG}$" holds the electrical charges accumulated in a pixel array 400 and read into transistor 715. The electrical charges held by capacitors 730 are then released to transistors 715-720 for generating a set of analog image samples corresponding to the electrical charges.

It is appreciated that capacitors 725-730 are required to have a size to support only the first bit depth used by the ADCs in the output stages 430-435 following the first and second column readout circuits 420-425. Capacitors 725-730 may be smaller than the capacitors used to support the second bit depth of the processor 440.

Accordingly, CMOS image sensor apparatus 400 is able to provide a higher dynamic range of the second bit depth by using much smaller capacitors than would traditionally be required for capacitors sized to support the second bit depth. This provides further savings in circuitry manufacturing and complexity costs while achieving a higher dynamic range.

It is also appreciated that sample and hold circuit 700 is a correlated double sampler. The first set of analog image samples acquired at transistor 715 corresponds to image samples readout during reset of the reset transistor in each pixel of pixel array 705. The second set of analog image samples acquired at transistor 720 corresponds to image samples readout after the reset period. The first and second set of analog image samples may then be subtracted from each other at the following output stage to eliminate the reset noise in CMOS image sensor apparatus 400.

Figure 8:
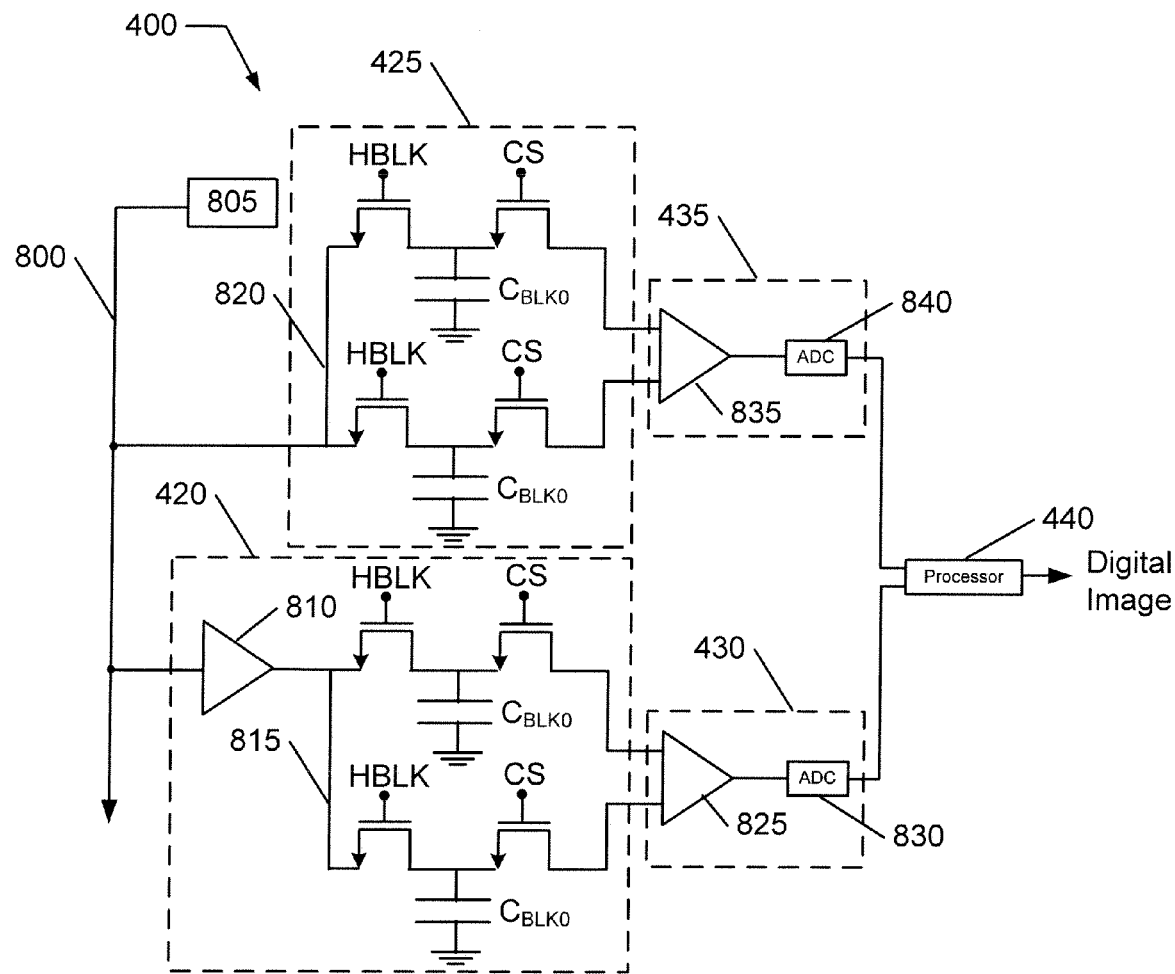
FIG. 8 illustrates a view of a CMOS image sensor apparatus including the sample and hold circuit of FIG. 7 and constructed according to an embodiment of the invention.

Another detailed view of the CMOS image sensor apparatus 400 is illustrated in FIG. 8. CMOS image sensor apparatus 400 is shown with column line 800 connected to pixels 805. First column readout circuit 420 includes column amplifier 810 and sample and hold circuit 815 designed according to the exemplary embodiment shown in FIG. 7. Second column readout circuit 415 includes sample and hold circuit 820 also designed according to the exemplary embodiment shown in FIG. 7.

First output stage 430 connected to first column readout circuit 420 includes global amplifier 825 and ADC of a first bit depth 830. Second output stage 435 connected to second column readout circuit 425 includes global amplifier 835 and ADC of a first bit depth 840. The first and second output stages 430-435 are connected to processor 440 for generating a digital image output.

It is appreciated that sample and hold circuits 815-820 may be equivalent. It is also appreciated that global amplifiers 825 and 835 may also be equivalent. In an exemplary embodiment, sample and hold circuits 815-820 may be correlated double samplers and global amplifiers 825 and 835 may be differential amplifiers to subtract the first and second analog image sample sets generated by the correlated double samplers. Further, it is appreciated that ADCs 830 and 840 may also be equivalent.

As described in more detail herein above, it is appreciated that first and second output stages are connected to a plurality of first and second column readout circuits, with each first and second column readout circuits connected to a given column line of pixel array 405. It is also appreciated that the "RS" (row select) control signal in each pixel of pixel array 405 and the "CS" (column select) control signal in each sample and hold circuit of the column readout circuits indicate to output stages 430-435 which pixel in a given row and column is to be read out at any given time.

Advantageously, the CMOS image sensor apparatus 400 generates a digital image output having a higher dynamic range while using simpler and less costly circuit components. For example, the CMOS image sensor apparatus 400 may achieve a 14-bit dynamic range while using only 10-bit ADCs and sample and hold circuits having capacitors sized to support 10-bit ADCs. This enables the dynamic range gap currently in place between CMOS and CCD image sensors to be reduced significantly, as the CMOS image sensor apparatus 400 provides digital images of high dynamic ranges with design and manufacturing costs similar to or better than those of CCD image sensors counterparts.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications: they thereby enable others skilled in the art to best utilize the invention and various embodiments with various modifications as are suited to the particular use contemplated. It is intended that the following claims and their equivalents define the scope of the invention.

What is claimed is:

1. An image sensor apparatus, comprising:
    an image sensor for generating a first and a second set of digital image samples at a first bit depth, each set of digital image samples generated by a different column readout circuit path; the image sensor including:
        (a) an array of pixels arranged in a plurality of row lines and column lines,
        (b) a plurality of first and second column readout circuits connected in parallel to the plurality of column lines, each first column readout circuit in a first column readout circuit path and each second column readout circuit in a second column readout circuit path; wherein each column line is connected in parallel to both a first column readout circuit and a second column readout circuit, and
        (c) a first output stage connected to the first column readout circuit and a second output stage connected to the second column readout circuit, wherein the first and second output stages are independent of one another and comprise a differential amplifier and an analog-to-digital converter having the first bit depth; and
    a processor for combining the first and the second set of digital image samples to generate a digital image at a second bit depth, the second bit depth higher than the first bit depth.

2. The image sensor apparatus of claim 1, wherein the first and second column readout circuit paths have different amplification responses.

3. The image sensor apparatus of claim 1 wherein the plurality of first column readout circuits comprises a column amplifier and a first sample and hold circuit.

4. The image sensor apparatus of claim 3, wherein the plurality of second column readout circuits comprises a second sample and hold circuit.

5. The image sensor apparatus of claim 4, wherein the first and the second sample and hold circuits each comprise a set of capacitors sized to support the first bit depth.

6. The image sensor apparatus of claim 1, wherein the processor comprises executable routines for averaging the first and second set of digital image samples to generate the digital image.

7. An image sensor apparatus for emulating a dynamic range achievable with a first bit depth analog-to-digital converter, comprising:
    an array of pixels arranged in a plurality of row lines and column lines;
    a plurality of first column readout circuits comprising a first sample and hold circuit;
    a plurality of second column readout circuits comprising a second sample and hold circuit,
    wherein the first and second sample and hold circuits comprise a correlated double sampler and the first and second readout circuits connect connected in parallel to the plurality of column lines, each column line connected in parallel to both a first column readout circuit and a second column readout circuit of the plurality of readout circuits, each first column readout circuit connected to a first output stage and each second column readout circuit connected to a second output stage, the first and second output stages being independent of one another and generating digital image samples at a second bit depth; and
    a processor connected to the first and second output stages to receive the digital image samples at the second bit depth and generate a digital image output of the first bit depth from the digital image samples.

8. The image sensor apparatus of claim 7, wherein the first and second sample and hold circuit comprise a set of capacitors sized to support the second bit depth.

9. The image sensor apparatus of claim 8, wherein the second sample and hold circuit is equivalent to the first sample and hold circuit.

10. The image sensor apparatus of claim 7, wherein the first and the second output stages comprise a global amplifier and an analog-to-digital converter having the second bit depth.

11. The image sensor apparatus of claim 10, wherein the global amplifier comprises a differential amplifier.

12. The image sensor apparatus of claim 7, wherein the array of pixels comprises a plurality of pixels, each pixel having four transistors.

13. The image sensor apparatus of claim 7, wherein the first bit depth is higher than the second bit depth.

14. A method for providing high dynamic range digital images with a CMOS image sensor, comprising:
generating electrical charges from incident light with an array of pixels arranged in a plurality of row lines and column lines;
reading the electrical charges from the array of pixels with a plurality of first and second column readout circuits connected in parallel to the plurality of column lines with each column line connecting in parallel to a first column readout circuit and a second column readout circuit of the plurality of readout circuits, the first and second column readout circuits having different amplification responses;
converting the electrical charges into digital image samples of a first bit depth with a first and a second output stage, the first output stage connected to the plurality of first column readout circuits and the second output stage connected to the plurality of second column readout circuits, the first and second output stages being independent of one another and comprising a differential amplifier and an analog-to-digital converter having the first bit depth; and
processing the digital image samples to generate a digital image output at a second bit depth.

15. The method of claim 14, wherein reading the electrical charges comprises amplifying the electrical charges with a column amplifier and generating analog image samples with a sample and hold circuit.

16. The method of claim 15, wherein converting the electrical charges into digital image samples comprises converting the analog image samples into digital image samples with an analog-to-digital converter having the first bit depth.

17. The method of claim 15, wherein the second bit depth is higher than the first bit depth.

18. An image sensor apparatus for generating a digital image output, the image sensor apparatus comprising an image sensor for generating digital image samples at a first bit depth with a first and a second column readout circuit path of different amplification responses, the first bit depth smaller than a second bit depth of the digital image output, the first and second paths connecting in parallel to one column of a pixel array to read concurrently from each pixel of the column;
wherein the first column readout circuit connects with a first output stage and the second column readout circuit connects with a second output stage;
wherein the first and second output stages comprise a differential amplifier and an analog-to-digital converter having the first bit depth, and
wherein the first and second output stages are independent of one another.

* * * * *